United States Patent
Strumolo et al.

(10) Patent No.: US 6,831,572 B2
(45) Date of Patent: Dec. 14, 2004

(54) REAR COLLISION WARNING SYSTEM

(75) Inventors: Gary Steven Strumolo, Beverly Hill, MI (US); Ronald Hugh Miller, Saline, MI (US); Priyaranjan Prasad, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 09/683,636

(22) Filed: Jan. 29, 2002

(65) Prior Publication Data

US 2003/0141966 A1 Jul. 31, 2003

(51) Int. Cl.$^7$ ................................................. G08G 1/16
(52) U.S. Cl. ....................... 340/903; 340/902; 340/904; 340/435; 340/436; 367/99; 367/909; 180/167; 180/169; 180/171
(58) Field of Search .............................. 340/903, 902, 340/904, 435, 436; 367/99, 909; 180/167, 169, 171

(56) References Cited

U.S. PATENT DOCUMENTS

| | | | |
|---|---|---|---|
| 3,514,610 A | | 5/1970 | Huston et al. |
| 3,892,483 A | * | 7/1975 | Saufferer .................... 356/3.12 |
| 4,257,703 A | | 3/1981 | Goodrich |
| 4,381,829 A | | 5/1983 | Montaron |
| 4,623,966 A | | 11/1986 | O'Sullivan |
| 4,626,850 A | * | 12/1986 | Chey ........................... 340/903 |
| 4,638,289 A | | 1/1987 | Zottnik |
| 4,673,937 A | | 6/1987 | Davis |
| 4,833,469 A | | 5/1989 | David |
| 4,916,450 A | | 4/1990 | Davis |
| 4,969,103 A | | 11/1990 | Maekawa |
| 4,992,943 A | | 2/1991 | McCracken |
| 4,994,972 A | | 2/1991 | Diller |
| 5,040,118 A | | 8/1991 | Diller |
| 5,063,603 A | | 11/1991 | Burt |
| 5,091,726 A | | 2/1992 | Shyu |
| 5,162,794 A | | 11/1992 | Seith |
| 5,166,881 A | | 11/1992 | Akasu |
| 5,173,859 A | | 12/1992 | Deering |
| 5,182,459 A | | 1/1993 | Okano et al. |
| 5,230,400 A | | 7/1993 | Kakinami et al. |
| 5,234,071 A | | 8/1993 | Kajiwara |
| 5,249,157 A | | 9/1993 | Taylor |
| 5,295,551 A | * | 3/1994 | Sukonick ..................... 180/167 |
| 5,307,136 A | | 4/1994 | Saneyoshi |
| 5,314,037 A | | 5/1994 | Shaw et al. |
| 5,428,439 A | * | 6/1995 | Parker et al. ............... 356/5.01 |
| 5,430,432 A | | 7/1995 | Camhi et al. |
| 5,467,283 A | | 11/1995 | Butsuen et al. |
| 5,479,173 A | | 12/1995 | Yoshioka et al. |
| 5,502,432 A | | 3/1996 | Ohmamyuda e t al. |

(List continued on next page.)

FOREIGN PATENT DOCUMENTS

| | | |
|---|---|---|
| EP | 0720928 A2 | 10/1996 |
| JP | 54-65934 A | 5/1979 |
| WO | WO 98/37435 | 8/1998 |
| WO | WOX 98/58274 | 12/1998 |

Primary Examiner—Daniel J. Wu
Assistant Examiner—Tai T. Nguyen
(74) Attorney, Agent, or Firm—Frank A. MacKenzie

(57) ABSTRACT

A rear collision warning system (10) for a target vehicle (17) and an approaching vehicle (18) is provided. The rear collision warning system (10) includes a first transmitter (54) located on the approaching vehicle (18) and directed at the target vehicle (17). The first transmitter (54) generates a vehicle information signal. A first indicator (16) located on the target vehicle (17). A first receiver (50) electrically coupled to the first indicator (16) receives the vehicle information signal and transmits a warning signal to the approaching vehicle (18) when the vehicle information signal is above a predetermined magnitude. A method of performing the same is also provided.

13 Claims, 2 Drawing Sheets

U.S. PATENT DOCUMENTS

| | | | | |
|---|---|---|---|---|
| 5,521,580 A | | 5/1996 | Kaneko et al. | |
| 5,526,269 A | | 6/1996 | Ishibashi et al. | |
| 5,534,870 A | | 7/1996 | Avignon et al. | |
| 5,541,590 A | | 7/1996 | Nishio | |
| 5,552,986 A | | 9/1996 | Omura et al. | |
| 5,572,428 A | | 11/1996 | Ishida et al. | |
| 5,574,463 A | | 11/1996 | Shirai et al. | |
| 5,594,414 A | | 1/1997 | Namngani | |
| 5,602,760 A | | 2/1997 | Chacon et al. | |
| 5,604,683 A | | 2/1997 | Roecker | |
| 5,629,847 A | | 5/1997 | Shirakawa et al. | |
| 5,635,922 A | | 6/1997 | Cho et al. | |
| 5,646,612 A | | 7/1997 | Byon | |
| 5,680,097 A | | 10/1997 | Uemura et al. | |
| 5,684,474 A | * | 11/1997 | Gilon et al. | 340/903 |
| 5,689,264 A | | 11/1997 | Ishikawa et al. | |
| 5,699,040 A | | 12/1997 | Matsuda | |
| 5,699,057 A | | 12/1997 | Ikeda et al. | |
| 5,710,565 A | | 1/1998 | Shirai et al. | |
| 5,745,870 A | | 4/1998 | Yamamoto et al. | |
| 5,748,477 A | | 5/1998 | Katoh | |
| 5,749,426 A | | 5/1998 | Gilling | |
| 5,751,211 A | | 5/1998 | Shirai et al. | |
| 5,751,836 A | | 5/1998 | Wildes et al. | |
| 5,754,099 A | | 5/1998 | Nishimura et al. | |
| 5,771,481 A | | 6/1998 | Gilling | |
| 5,779,264 A | | 7/1998 | Demesseman et al. | |
| 5,808,561 A | | 9/1998 | Kinoshita et al. | |
| 5,815,093 A | | 9/1998 | Kikinis | |
| 5,835,007 A | | 11/1998 | Kosiak | |
| 5,835,873 A | | 11/1998 | Darby et al. | |
| 5,838,228 A | | 11/1998 | Clark | |
| 5,847,472 A | | 12/1998 | Byon | |
| 5,847,755 A | | 12/1998 | Wixson et al. | |
| 5,872,536 A | | 2/1999 | Lyons et al. | |
| 5,905,457 A | | 5/1999 | Rashid | |
| 5,906,393 A | | 5/1999 | Mazur et al. | |
| 5,920,345 A | | 7/1999 | Sauer | |
| 5,926,126 A | | 7/1999 | Engelman | |
| 5,936,549 A | | 8/1999 | Tsuchiya | |
| 5,938,714 A | | 8/1999 | Satonaka | |
| 5,948,026 A | | 9/1999 | Beemer, II. et al. | |
| 5,949,366 A | | 9/1999 | Herrmann | |
| 5,949,918 A | | 9/1999 | McCaffrey | |
| 5,955,967 A | | 9/1999 | Yamada | |
| 5,959,552 A | | 9/1999 | Cho | |
| 5,963,272 A | | 10/1999 | Wixson | |
| 5,964,822 A | | 10/1999 | Alland et al. | |
| 5,983,161 A | | 11/1999 | Lemelson et al. | |
| 5,995,037 A | | 11/1999 | Matsuda et al. | |
| 5,999,117 A | | 12/1999 | Engel | |
| 5,999,874 A | | 12/1999 | Winner et al. | |
| 6,002,983 A | | 12/1999 | Alland et al. | |
| 6,018,308 A | | 1/2000 | Shirai | |
| 6,025,797 A | | 2/2000 | Kawai et al. | |
| 6,026,340 A | | 2/2000 | Corrado et al. | |
| 6,031,484 A | | 2/2000 | Bullinger et al. | |
| 6,037,860 A | | 3/2000 | Zander et al. | |
| 6,044,166 A | | 3/2000 | Bassman et al. | |
| 6,044,321 A | * | 3/2000 | Nakamura et al. | 701/96 |
| 6,049,619 A | | 4/2000 | Anandan et al. | |
| 6,061,105 A | | 5/2000 | Nakagawa | |
| 6,076,028 A | | 6/2000 | Donnelly et al. | |
| 6,084,508 A | | 7/2000 | Mai et al. | |
| 6,085,151 A | | 7/2000 | Farmer et al. | |
| 6,087,928 A | | 7/2000 | Kleinberg et al. | |
| 6,088,639 A | | 7/2000 | Fayyad et al. | |
| 6,094,159 A | | 7/2000 | Oterfeld et al. | |
| 6,097,332 A | | 8/2000 | Crosby, II | |
| 6,114,951 A | | 9/2000 | Kinoshita et al. | |
| 6,121,896 A | | 9/2000 | Rahman | |
| 6,148,943 A | | 11/2000 | Kodaka et al. | |
| 6,151,539 A | | 11/2000 | Bergholz et al. | |
| 6,157,892 A | | 12/2000 | Hada et al. | |
| 6,161,074 A | | 12/2000 | Sielagoski et al. | |
| 6,168,198 B1 | | 1/2001 | Breed et al. | |
| 6,169,479 B1 | | 1/2001 | Boran et al. | |
| 6,177,866 B1 | | 1/2001 | O'Connell | |
| 6,185,490 B1 | | 2/2001 | Ferguson | |
| 6,186,539 B1 | | 2/2001 | Foo et al. | |
| 6,188,316 B1 | | 2/2001 | Matsuno et al. | |
| 6,191,704 B1 | | 2/2001 | Takenaga et al. | |
| 6,204,756 B1 | | 3/2001 | Senyk et al. | |
| 6,209,909 B1 | | 4/2001 | Breed | |
| 6,218,960 B1 | | 4/2001 | Ishikawa et al. | |
| 6,219,606 B1 | | 4/2001 | Wessels et al. | |
| 6,223,125 B1 | | 4/2001 | Hall | |
| 6,225,918 B1 | | 5/2001 | Kam | |
| 6,226,389 B1 | | 5/2001 | Lemelson et al. | |
| 6,229,438 B1 | | 5/2001 | Kutlucinar et al. | |
| 6,246,961 B1 | | 6/2001 | Sasaki et al. | |
| 6,249,738 B1 | | 6/2001 | Higashimata et al. | |
| 6,256,584 B1 | | 7/2001 | Kodaka et al. | |
| 6,259,992 B1 | | 7/2001 | Urai et al. | |
| 6,278,360 B1 | * | 8/2001 | Yanagi | 340/436 |
| 6,337,638 B1 | * | 1/2002 | Bates et al. | 340/904 |
| 6,359,552 B1 | * | 3/2002 | King | 340/436 |
| 6,580,374 B2 | * | 6/2003 | Schrage | 340/933 |
| 6,614,387 B1 | * | 9/2003 | Deadman | 342/70 |

\* cited by examiner

REAR COLLISION WARNING SYSTEM

BACKGROUND OF INVENTION

The present invention relates generally to collision warning systems, and more particularly to a method and apparatus for warning both operators of two imminent and potentially collidable vehicles of their close proximity.

Collision warning systems are becoming more widely used. Collision warning systems provide a vehicle operator knowledge and awareness of objects or vehicles within a close proximity so as to prevent colliding with those objects. Current collision warning systems are unitary in nature in that they only warn the operator of the vehicle containing the collision warning system of a potential collision. A sensor located on a vehicle, upon sensing an object generates an object detection signal, which is communicated to the operator of that vehicle.

Typically, a collision that occurs between two moving vehicles occurs over a short duration of time, that may not be long enough in extent for an operator to react. Reaction time is critical in preventing collisions. The longer the available reaction time, the lower the probability of the collision ever occurring. Some data indicates that half of all collisions between vehicles could be avoided if each driver would initiate his accident avoidance maneuver between one and one half second earlier. A factor that affects operator reaction time is the manner in which a vehicle collision warning system indicates to the operator an impending collision. Other factors are also relevant in preventing a collision such as whether the operator is distracted so as to not visualize or hear a collision-warning signal, which can impede the operator from reacting in time.

Current collision warning systems have absorbed some of these potential downfalls by creating large lead times, thereby warning the operator far in advance of a potential collision. Some active collision warning systems have considered interrupting verbal and visual communications within the vehicle or applying the brakes or other countermeasures. Yet other warning systems have considered the use of deceleration brake lights that have widening illumination with decreases in vehicle speed, as to warn rearly approaching vehicles of a nearing decelerating vehicle.

The above-mentioned warning systems have several disadvantages. Due to drastically increased warning times the operator of a vehicle may be prematurely warned of a potential collision. The operator, because of the far in advance warning, may find the system to be inaccurate and less likely to heed to the warning signals. Therefore, the above warning systems are limited in their prevention of a collision. The above-mentioned warning systems also do not address closing speed of the approaching vehicle and the likelihood of a collision.

Therefore, it would be desirable to provide an improved rear collision warning system. The improved system may increase reaction time and decrease the probability of a collision occurring.

SUMMARY OF INVENTION

Accordingly, an advantage of the present invention is to provide an improved rear collision warning system for use in an automotive vehicle.

The foregoing and other advantages are provided by a method and apparatus for warning both operators of two imminent and potentially collidable vehicles of their close proximity. A rear collision warning system for a target vehicle and an approaching vehicle is provided. The rear collision warning system includes a first transmitter located on the approaching vehicle and directed at the target vehicle. The first transmitter generates a vehicle information signal to a first indicator located on the target vehicle. A first receiver electrically coupled to the first indicator receives the vehicle information signal and transmits a warning signal to the approaching vehicle when the vehicle information signal is above a predetermined magnitude. A method of performing the same is also provided.

One of several advantages of the present invention is that it provides a system for not only warning a target vehicle of a potential collision, but also warning an approaching vehicle.

Another advantage of the present invention is that it increases the reaction time for both operators of the target vehicle and the approaching vehicle. Thereby, decreasing the probability of a collision between the two vehicles.

Additionally, the present invention provides multiple methods of warning both vehicle operators of the potential for a collision, increasing the overall versatility of the rear collision warning system.

Furthermore, the present invention provides a method for enacting countermeasures to prevent injury of the vehicle operators in case of a collision.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention.

DETAILED DESCRIPTION

While the present invention is described with respect to a method and apparatus for warning both operators of two imminent and potentially collidable vehicles of their close proximity, the present invention may be adapted to be used in various systems including: forward collision warning systems, collision avoidance systems, vehicle systems, or other systems that may require collision avoidance.

In the following description, various operating parameters and components are described for one constructed embodiment. These specific parameters and components are included as examples and are not meant to be limiting.

Also, in the following description, the terms "target vehicle" and "approaching vehicle" are relative terms used to reference a vehicle for a particular situation or application of the present invention. By no means do these terms only refer to a certain vehicle position relative to the position of another vehicle. For example, an approaching vehicle may refer to a first vehicle that is approaching a second vehicle from behind or it may refer to the second vehicle that is forward of the first vehicle but is becoming closer to the first vehicle.

Figure 1:
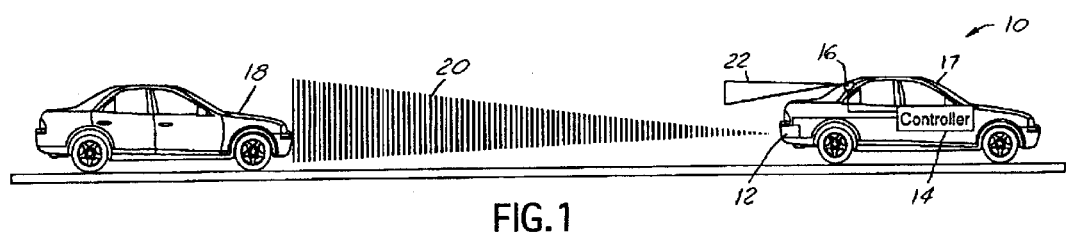
FIG. 1 is a schematic view illustrating a sensor implementation technique of a rear collision warning system in accordance with an embodiment of the present invention.

Referring now to FIG. 1, a schematic view illustrating a sensor implementation technique of a rear collision warning system 10 in accordance with an embodiment of the present invention is shown. The system 10 includes an object detection sensor 12, a controller 14, and an indicator 16, all of which are located on a target vehicle 17. The object detection sensor 12 senses an approaching vehicle 18, represented by field lines 20, and generates a detection signal that is transferred to the controller 14. The controller 14 determines whether the detection signal is greater than a predetermined magnitude, constituting that the approaching vehicle 18 is within a predetermined distance and/or is accelerating toward or approaching the target vehicle 17. The controller 14 warns the operator of the approaching vehicle 18 by a warning signal, represented by triangle 22, via the indicator 16 that the approaching vehicle 18 may potentially collide with the target vehicle 17. In so doing, the operator of the approaching vehicle 18 may react upon sensing the warning signal 22 and preventing a collision with the target vehicle 17. In a less sophisticated system the object detection sensor 12 may directly transmit a warning signal to the indicator 16 when the detection signal is above the predetermined magnitude. The use of controller 14 provides added advantages over non-use of the controller 14 that will become more evident in the following description.

The object detection sensor 12 may be of various form and style including a radar sensor, a scanning laser radar sensor, a pair of stereo camera sensors, an infrared sensor, an ultrasonic sensor, or other sensor known in the art for detecting an object. The object sensor may be also located in various locations on the target vehicle 17.

Controller 14 is preferably a microprocessor based controller such as a computer having a central processing unit, memory (RAM and/or ROM), and associated inputs and outputs communicating across a bus. Controller 14 may be a portion of central vehicle main control unit or a stand-alone rear collision controller.

The indicator 16 may be a pulsating indicator, a light bulb, an LED, a fluorescent light, a brake light, a tail light, a hazard light, a horn, or any other indicator that an operator of a vehicle may sense visually or audibly. The indicator 16 may vary in intensity, amplitude, size, or in a way so as to communicate to an operator of an approaching vehicle 18 that the potential for colliding with the target vehicle 17 is increasing or decreasing depending upon the proximity and/or velocity of the approaching vehicle 18 relative to the target vehicle 17.

Figure 2:
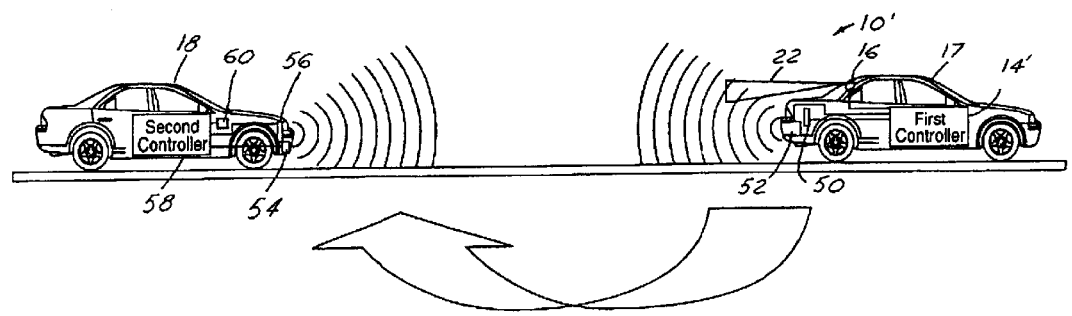
FIG. 2 is a schematic view of a wireless communication implementation technique of a rear collision warning system in accordance with another embodiment of the present invention.

Referring now to FIG. 2, a pictorial view of a wireless communication implementation of a rear collision warning system 10" in accordance with another embodiment of the present invention is shown. The system 10" includes a first receiver 50, a second transmitter 52, a first controller 14", and a first indicator 16, all of which are located in the target vehicle 17. The system 10" also includes a first transmitter 54, a second receiver 56, a second controller 58, and a second indicator 60, all of which are located in the approaching vehicle 18. The approaching vehicle 18 continuously transmits an information signal containing information of the location, velocity, and direction of travel of the approaching vehicle 18. The first controller 14" receives the information signal via the first receiver 50 and determines whether to warn the operator of the approaching vehicle 18 via the indicator 16 and, if so, in what manner. As with the object detection sensor 16 in system 10, the first receiver 50 may directly transmit a warning signal to the first indicator 16. The first controller 14" may also transmit a warning signal via the second transmitter 52 to the second receiver 56, as to communicate the warning signal to the second controller 58. The second controller 58 may then determine whether, using the second indicator 60, to warn the operator of the approaching vehicle 18.

The transmitters 52 and 54 and the receivers 50 and 56 may be part of a radar system, a scanning laser radar system, a stereo camera system, an infrared sensing system, an ultrasonic sensing system, or other sensing system known in the art. The transmitters 52 and 54 and the receivers 50 and 56 may also be part of a communication system such as a Bluetooth wireless communication system, an 802.11A wireless communication system, an 802.11B wireless communication system, a satellite wireless communication system, or other communication system. The receivers 50 and 56 may be one of the following type: an AM/FM receiver, a wireless communication system receiver, a telematic system receiver, a global positioning system (GPS) receiver, a satellite receiver, and a navigation system receiver. The receivers 50 and 56 may receive warning signals or approaching vehicle information from either controller 14" or 58, or a communication system external to both the approaching vehicle 18 and target vehicle 17. For example, the receivers 50 and 56 may receive position information, of either vehicle 18 or 17, from global positioning data received as part of a GPS.

Controllers 14" and 58 are similar to controller 14, in system 10, as to their internal componentry and some potential locations and uses within a vehicle. The controllers 14" and 58 may have additional logic and memory, above that of controller 14, as to satisfy additional features of system 10".

The second indicator 60 may be of various type and style including a computer, an LED display, an LED, a PDA, a light bulb, a heads-up display, an audio system, a video system, or other indicator known in the art. Further explanation of the audio system and the video system is below and best illustrated in FIG. 3.

Figure 3:
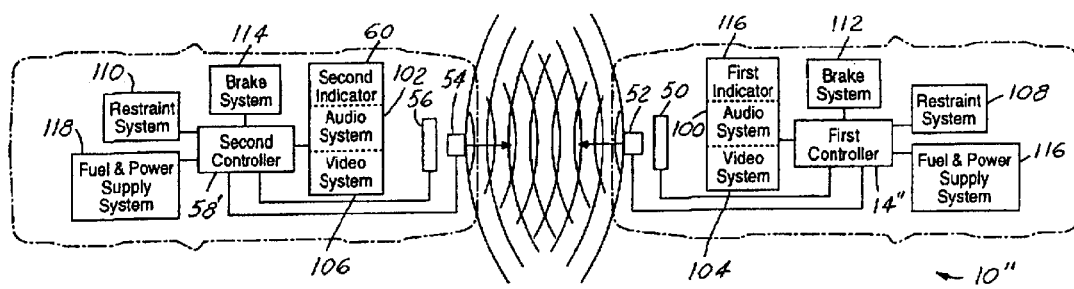
FIG. 3 is a block diagram of a rear collision warning system in accordance with another embodiment of the present invention.

Referring now to FIG. 3, a block diagrammatic view of a rear collision warning system 10"" in accordance with another embodiment of the present invention is shown. System 10"" includes the transmitters 52 and 54, receivers 50 and 56, and indicators 16 and 60 as in system 10". System 10"" also includes a first controller 14"" and a second controller 58", which are similar to controllers 14" and 58, respectively. Controllers 14"" and 58" may have additional logic and memory, above that of controllers 14" and 58, for use in system 10"". The system 10"" also includes audio systems 100 and 102, video systems 104 and 106, restraint systems 108 and 110, braking systems 112 and 114, and fuel and power supply systems 116 and 118 for the target vehicle 17 and the approaching vehicle 18, respectively.

The audio systems 100 and 102 and the video systems 104 and 106 of both the approaching vehicle 18 and the target vehicle 17 may be in communication with the second controller 58" and the first controller 14"", respectively, and be used as an indicator to warn an operator of a potential collision. The audio systems 100 and 102 may include a vehicle stereo system, a computer generated audio system, an entertainment system, and a sound-conveying device. Audio systems 100 and 102 may warn an operator in a verbal format such as a recorded voice, warning tones, and text-to-speech. Video systems 104 and 106 may include a radar display, a data capable phone, a wireless-enabled personal digital assistant, a navigation system, a telematic system, and a video entertainment system. The audio systems 100 and 102 and the video system 104 and 106 convey approaching vehicle information to an operator including proximity, position, velocity, distance, direction of travel, time to impact, and other relative information as to inform the operator of a potential collision. Time to impact refers to the amount of time between a warning signal and a predicted time of collision. The time to impact preferably includes velocity of the approaching vehicle 18 relative to the target vehicle 17. Time to impact may also include other components such as whether one vehicle is accelerating or not, the distance between the vehicles, or other factors that may effect the probability of the approaching vehicle 18 colliding with the target vehicle 17 in a predicted time frame.

The restraints systems 108 and 110 of the approaching vehicle 18 and the target vehicle 17 are enacted by the controllers 14"" and 58" as a countermeasure to protect operators of both vehicles, in case of a collision. The restraint systems 108 and 110 may include a vehicles air bag deployment system containing frontal, side, side curtain, or other vehicle air bags. The restraint systems 108 and 110 may also include pretensioners, seat positioning systems, head restraint systems, or other restraint systems.

The controllers 14"" and 58" may also activate the braking systems 112 and 114, downshift a vehicle transmission (not shown), or deactivate a vehicle fuel system or a portion of a vehicle power supply system in order to reduce traveling velocity of the vehicle and maintain a predetermined distance between the approaching vehicle 18 and the target vehicle 17. This is another added precautionary measure, of the present invention, in preventing a potential collision.

All of the above-mentioned systems and embodiments of the present invention are not meant to be separate all-inclusive systems; they may share components and systems from each other depending upon the application.

Figure 4:
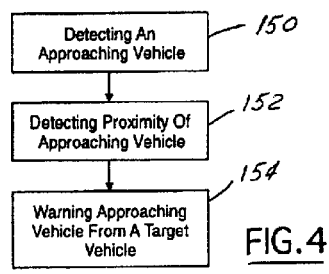
FIG. 4 is a logic flow diagram illustrating a method of preventing a rear collision between an approaching vehicle and a target vehicle, according to an embodiment of the present invention.

Referring now to FIG. 4, a logic flow diagram illustrating a method of preventing a rear collision between an approaching vehicle and a target vehicle is shown, in accordance with an embodiment of the present invention.

In step 150, an object detection sensor or a first receiver detects the approaching vehicle and signals a first controller as described above.

In step 152, the first controller determines the proximity of the approaching vehicle relative to the target vehicle. The proximity is determined, using one of several methods including the target vehicle sensing the approaching vehicle, the target vehicle receiving a communication signal from the approaching vehicle, or the target vehicle determining proximity as part of a communication system that is partially external to both the approaching vehicle and the target vehicle. Proximity includes the relative position and distance of the approaching vehicle. The first controller, as stated above, may also determine the velocity and direction of travel of the approaching vehicle relative to the target vehicle, as well as, other factors in determining the probability of a collision between the approaching vehicle and the target vehicle.

In step 154, the first controller continuously monitors the above-mentioned factors and signals the operators of the approaching vehicle and the target vehicle of a potential collision when any of the above mentioned factors are above corresponding predetermined magnitude or threshold levels. Controllers located on the approaching vehicle and the target vehicle then determine, in response to the above factors, whether to enact a countermeasure, and what countermeasures to enact. For example, when the time to impact is less than a particular predetermined duration, a controller may enact a pretensioner to pull the operator of a vehicle further into a driver seat as to aid in preventing operator injury during a collision. The proactive action of the controller activating the pretensioner further indicates to the operator that a collision has a high probability of occurring.

The present invention provides an improved rear collision warning system that increases reaction time for both the operator of an approaching vehicle and the operator of a target vehicle. The present invention is passive in that it warns vehicle operators of a potential collision and it is also active in that it activates countermeasures as to prevent a collision from ever occurring. The variety of potential uses and the versatility of the present invention allow it to be used for various purposes having various system and cost requirements.

The above-described apparatus, to one skilled in the art, is capable of being adapted for various purposes and is not limited to the following systems: forward collision warning systems, collision avoidance systems, vehicle systems, or other systems that may require collision avoidance. The above-described invention may also be varied without deviating from the spirit and scope of the invention as contemplated by the following claims.

What is claimed is:

1. A rear collision warning system for a target vehicle and an approaching vehicle comprising:

a first transmitter located on the approaching vehicle and directed at the target vehicle, said first transmitter generating a vehicle information signal comprising at least partially approaching vehicle related information;

a first indicator located on the target vehicle; and a first receiver electrically coupled to said first indicator, said first receiver receiving said vehicle information signal and generating a warning signal that is indicated via said indicator to the approaching vehicle when said vehicle information signal is above a predetermined magnitude.

2. A system as in claim 1 further comprising a first controller electrically coupled to said first receiver and said first indicator, said first controller receiving said vehicle information signal and transmitting said warning signal to said first indicator when said vehicle information signal is above said predetermined magnitude.

3. A system as in claim 2 further comprising said first controller determining relative velocity of the approaching vehicle relative to velocity of the target vehicle and signaling said first indicator in response to said relative velocity of the approaching vehicle.

4. A system as in claim 2 further comprising said first controller determining proximity of the approaching vehicle relative to the target vehicle and signaling said first indicator in response to said determined proximity.

5. A system as in claim 4 wherein said proximity comprises the relative position of said approaching vehicle to said target vehicle and distance between the target vehicle and the approaching vehicle.

6. A system as in claim 2 further comprising said first controller determining direction of travel for said approaching vehicle relative to said target vehicle and signalling said first indicator in response to said determined direction of travel.

7. A system as in claim 2 further comprising:
said first controller determining time to impact between the target vehicle and the approaching vehicle in response to relative proximity of the target vehicle and the relative velocity of the target vehicle; and
said first controller warning said approaching vehicle in response to said time to impact.

8. A system as in claim 2 further comprising:
said first controller determining time to impact between the target vehicle and the approaching vehicle in response to relative proximity of the target vehicle and the relative velocity of the target vehicle; and
said first controller warning said target vehicle in response to said time to impact.

9. A system as in claim 2 further comprising:
a second transmitter located on the target vehicle and electrically coupled to said first controller;
a second indicator located on the approaching vehicle;
a second receiver electrically coupled to said indicator; and
a second controller electrically coupled to said first transmitter, said second indicator, and said second receiver, said second controller in response to receiving said warning signal from said first controller via said second transmitter and said second receiver signaling said second indicator.

10. A system as in claim 9 further comprising said second controller in response to said warning signal enacting a countermeasure, within the approaching vehicle, selected from the group consisting of: activating brakes, inhibiting fuel consumption, retracting seat belts, adjusting seat positioning, and downshifting a transmission.

11. A system as in claim 2 further comprising said first controller in response to said warning signal enacting a countermeasure, within the target vehicle, selected from the group consisting of: activating brakes, inhibiting fuel consumption, retracting seat belts, adjusting seat positioning, and downshifting a transmission.

12. A system as in claim 2 further comprising a wireless communication system for receiving and transmitting proximity, velocity, and direction of travel data, said wireless communication system selected from the following group consisting of: a Bluetooth wireless communication system, a 802.11A wireless communication system, a 802.11B wireless communication system, and a satellite wireless communication system.

13. A system as in claim 2 further comprising said second controller signaling said second indicator in response to relative approaching vehicle proximity, velocity, or direction of travel.

* * * * *